Sept. 28, 1971      G. R. BIRKEMEIER ET AL      3,608,177

METHOD OF ASSEMBLING A TENSION RING JOINT STRUCTURE

Original Filed May 17, 1968      5 Sheets-Sheet 3

INVENTORS
GEORGE R. BIRKEMEIER
HOLLIS C. SCOTT
BY
BUCKHORN, BLORE, KLARQUIST & SPARKMAN
ATTORNEYS

Sept. 28, 1971     G. R. BIRKEMEIER ET AL     3,608,177
METHOD OF ASSEMBLING A TENSION RING JOINT STRUCTURE
Original Filed May 17, 1968                        5 Sheets-Sheet 4
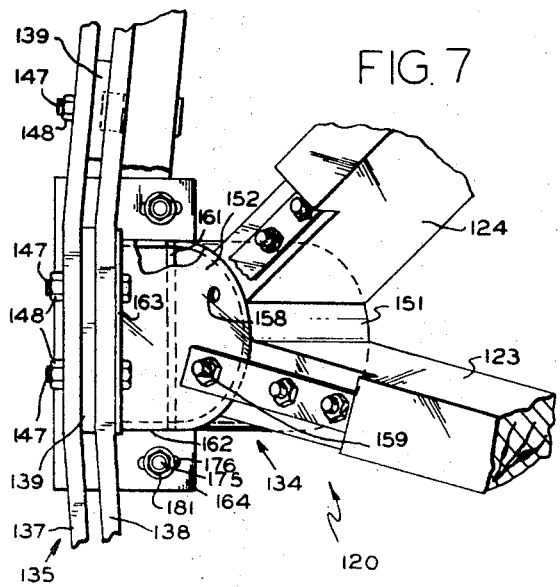
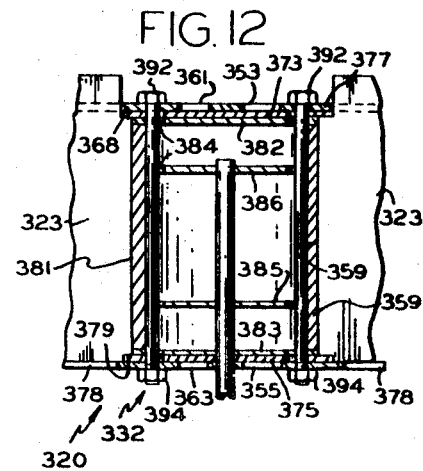
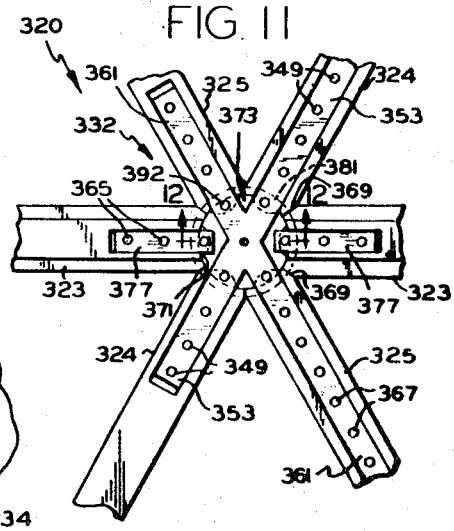
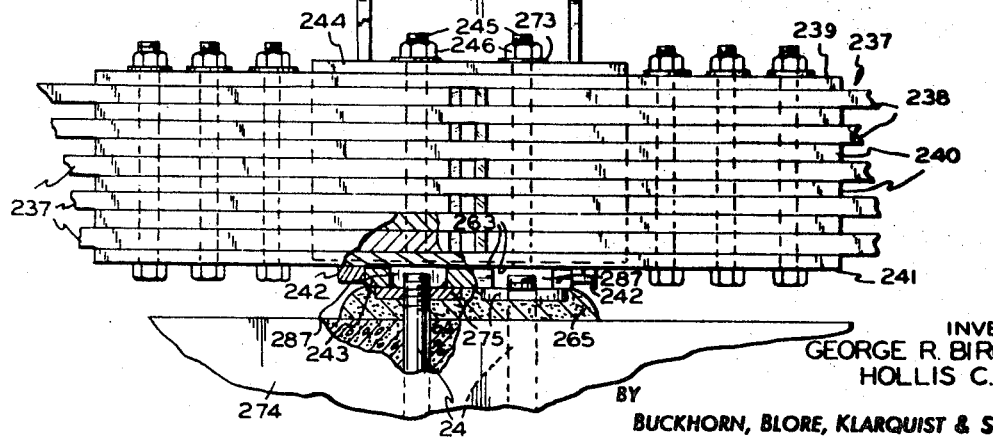
INVENTORS
GEORGE R. BIRKEMEIER
HOLLIS C. SCOTT
BY
BUCKHORN, BLORE, KLARQUIST & SPARKMAN
ATTORNEYS

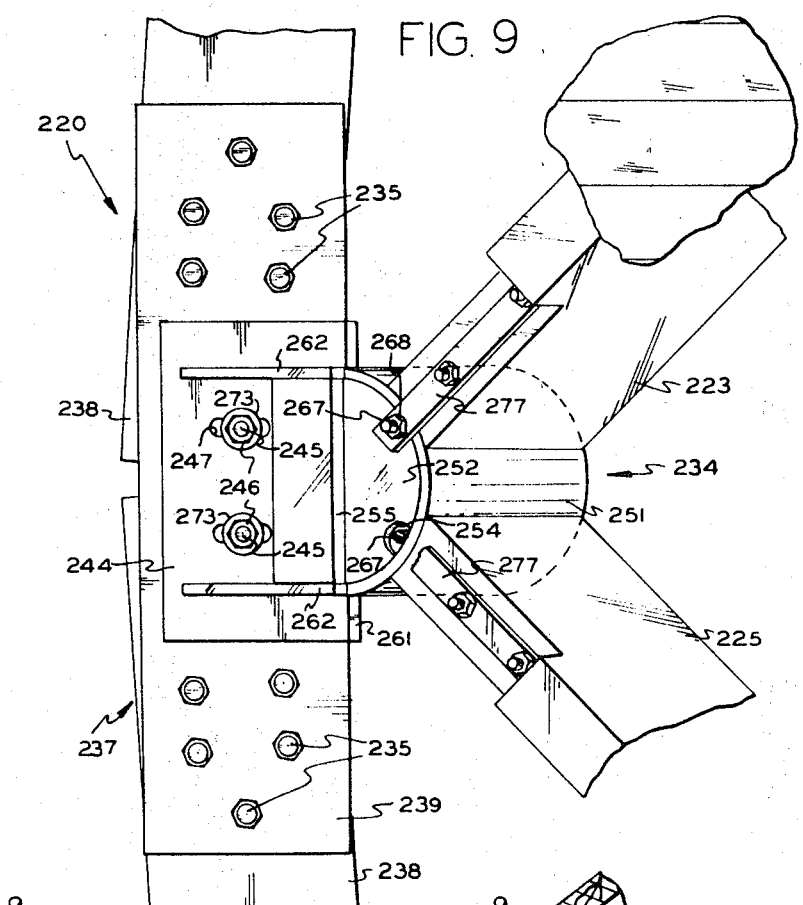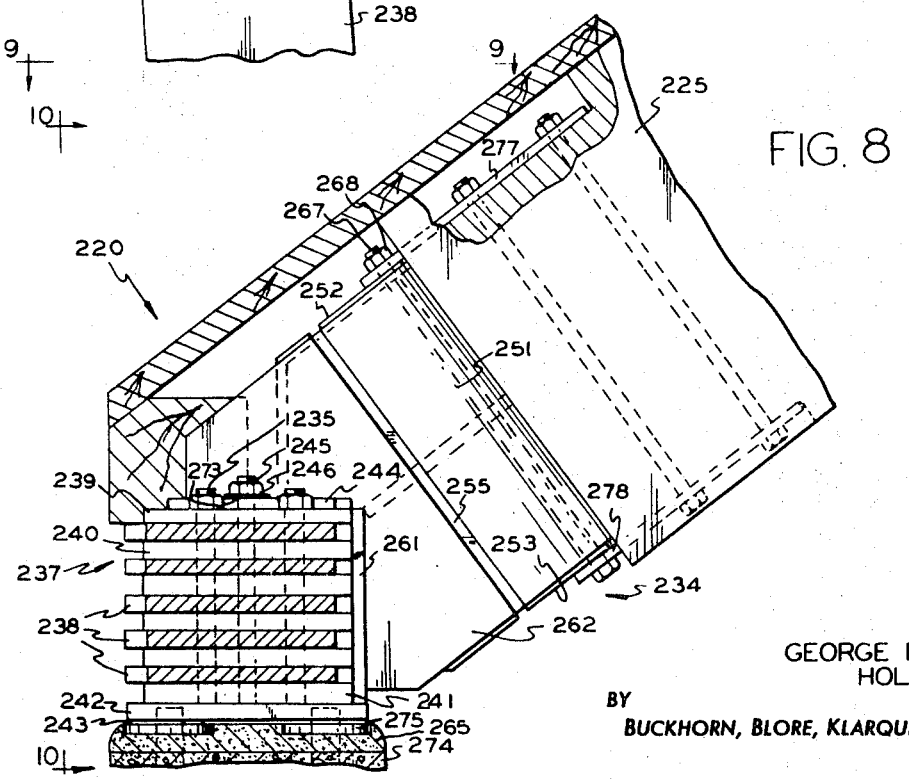

United States Patent Office 3,608,177
Patented Sept. 28, 1971

3,608,177
METHOD OF ASSEMBLING A TENSION RING JOINT STRUCTURE
George R. Birkemeier and Hollis C. Scott, Portland, Oreg., assignors to Timber Structures, Inc., Portland, Oreg.
Original application May 17, 1968, Ser. No. 729,952, now Patent No. 3,540,174, dated Nov. 17, 1970. Divided and this application Nov. 3, 1969, Ser. No. 873,213
Int. Cl. B23q 17/00
U.S. Cl. 29—407                                       2 Claims

ABSTRACT OF THE DISCLOSURE

A dome structure 20 (FIGS. 1 to 5) includes beams connected together in triangles by joints 31 and 32 and connected to a tension ring by joints 34. In each joint 31, bolts pass through straps connected to the beams and pass through clearance notches in stiffener plates welded to a tube and pass through and bear laterally against the inner periphery of the tube. Each joint 34 is similarly connected to the beams, has a vertical plate 63 connected to a tension ring and a base plate splined for radial movement only relative to the supporting wall. Low friction facings on the base plate and a supporting plate on the wall permit easy radial sliding. A dome structure 120 (FIGS. 6 and 7) has a double tension ring assembly 131 and has joints 134 in which bolts connect the beam straps of stiffening plates and pass through and bear against closefitting holes in the stiffening plates, which holes are spaced inwardly from the inside faces of tubes of the joints. In a dome structure 220 (FIGS. 8 and 10), a laminated tension ring is provided. In a dome structure 320 (FIGS. 11 and 12) a series of straps welded together in the same plane connect at least three beams to a joint, and shear plates also connect the beams to the joint.

DESCRIPTION

This application is a division of application Ser. No. 729,952, filed May 17, 1968, now Pat. No. 3,540,174 entitled "Dome Structures."

This invention relates to improved dome structures and more particularly to improved truss structures of domes.

An object of the invention is to provide new and improved dome structures.

Another object of the invention is to provide new and improved truss structures of domes.

A further object of the invention is to provide a joint connecting ends of beams together and including bolts passing through straps connected to the beams and bearing laterally against the inner periphery of a tube against the exterior of which the ends of the beam abut and bear.

Another object of the invention is to provide a joint connecting beams together and having a stiffening disc secured to a tube and provided with enlarged peripheral notches for clearance for connecting bolts.

Another object of the invention is to provide a joint connecting beams together in which a shear disc abutting one end of a tube extends beyond the exterior periphery of the tube and overlaps the ends of the beams.

Another object of the invention is to provide a joint connecting beams together in which shear discs abutting both ends of the tube extend beyond the exterior periphery of the tube and overlap the ends of the beams.

A further object of the invention is to provide a joint in which a strap extends over an end of a tube and connects two beams together.

Another object of the invention is to provide a joint in which a welded strap assembly extends over an end of the tube and connects three or more beams together.

Another object of the invention is to provide a joint having a tube against which beams abut and into which are secured stiffening plates having holes spaced inwardly from the inner periphery of the tube and closely receiving bolts connecting straps secured to the beams.

Another object of the invention is to provide dome structures having new and improved tension rings and tension ring joints.

Another object of the invention is to provide a dome structure in which a tension ring joint connecting beams and a tension ring is splined to a supporting wall for radial movement only and to prevent circumferential movement.

Another object of the invention is to provide a tension ring joint splined to a supporting wall and resting on a low friction support to permit radial movement only of the joint and to prevent circumferential movement of the joint.

Another object of the invention is to provide a dome structure having a multiple tension ring assembly.

The invention provides improved dome structures in which beams are connected together by beam joints and to a tension ring structure by tension ring joints. The tension ring joints are connected to a wall for radial movement only by low friction supports. In a dome structure forming a specific embodiment of the invention, a beam joint includes a tube against which bear beam ends and stiffening discs welded to the tube and having crescent shaped clearance notches through which extend bolts connected to straps fixed to the beams, the bolts bearing against the inner periphery of the tube. A tension ring joint of the dome structure may include a base plate having a bottom facing of polytetrafluoroethylene and abutting a facing of the same material on a support plate secured to the top of a wall, splining means being provided to spline the base plate to the wall to permit radial movement and to prevent circumferential movement. In a beam joint forming one specific embodiment of the invention stiffening discs welded to a tube have aligned holes spaced inwardly from the inner periphery of the tube and closely receiving bolts connected to straps bolted to beams. In a beam joint forming another specific embodiment of the invention, ends of the beam abut a tube and one or more shear discs are secured on the ends of the tube and overlap the ends of the beam.

In the drawings:

FIG. 1A is an enlarged, vertical, sectional view taken along line 1A—1A of FIG. 1;

FIG. 7 is a top plan view along line 7—7 of FIG. 6;

FIG. 8 is a fragmentary, vertical, sectional view of a dome structure forming an alternate embodiment of the invention;

FIG. 9 is a fragmentary, top plan view taken along line 9—9 of FIG. 8;

FIG. 10 is a fragmentary, partially sectional, side elevation view taken along line 10—10 of FIG. 8;

FIG. 11 is a fragmentary, top plan view of a dome structure forming an alternate embodiment of the invention; and FIG. 12 is an enlarged, vertical, sectional view taken along line 12—12 of FIG. 11.

EMBODIMENT OF FIGS. 1 TO 5

Figure 1:
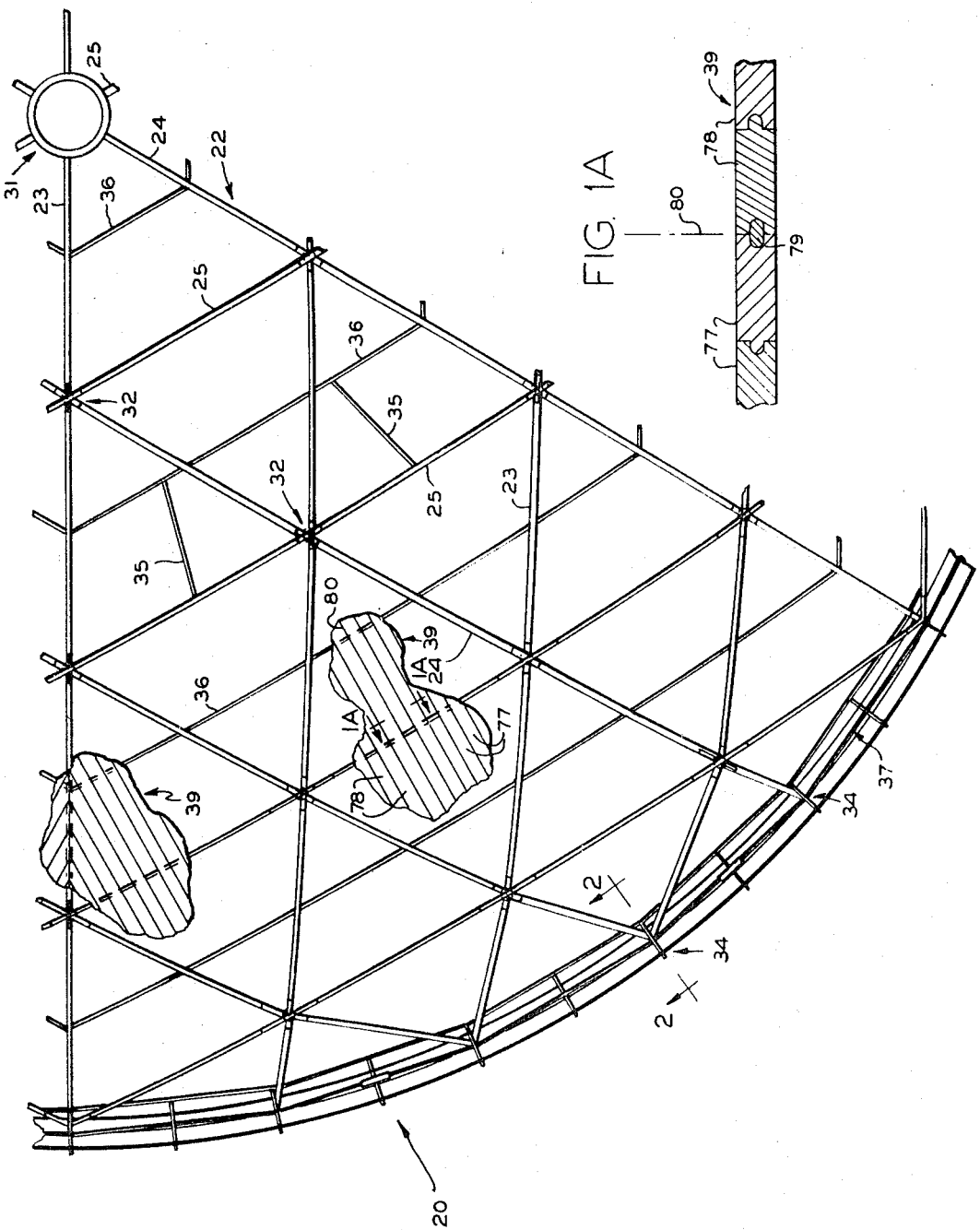
FIG. 1 is a fragmentary, partially schematic, top plan view of a dome structure forming one embodiment of the invention.
Figure 2:
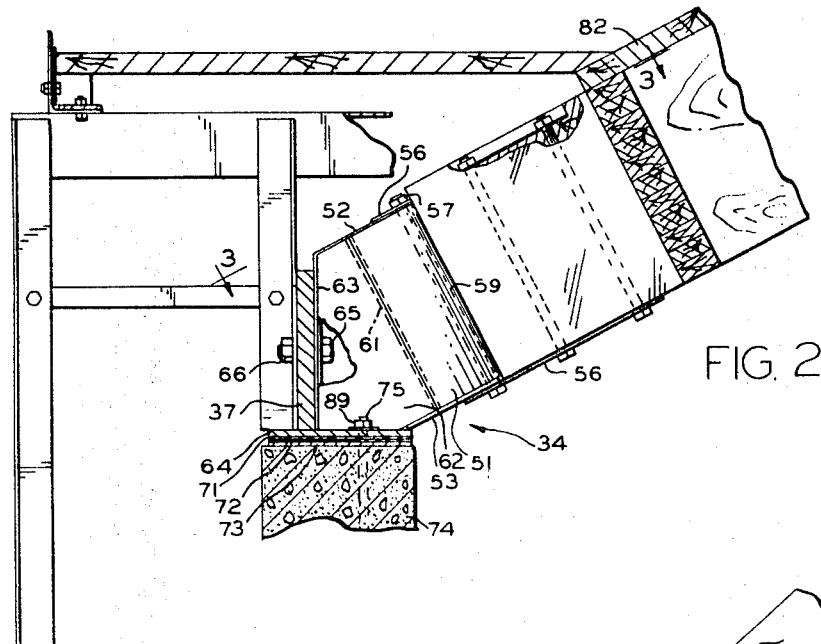
FIG. 2 is an enlarged, fragmentary, vertical, sectional view taken along line 2—2 of FIG. 1.
Figure 3:
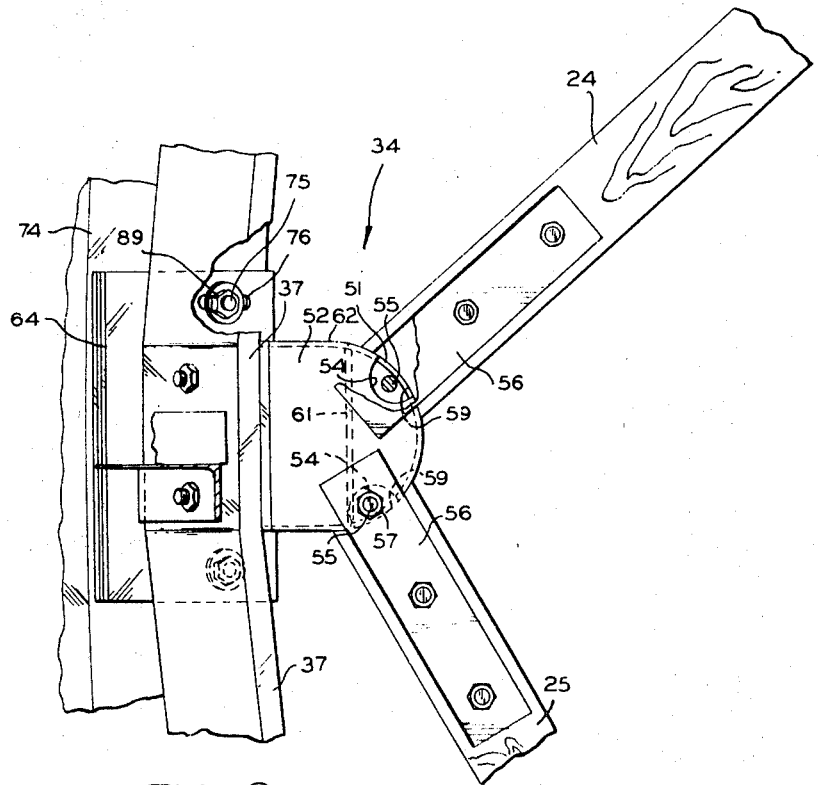
FIG. 3 is an enlarged, fragmentary, horizontal, sectional view taken along line 3—3 of FIG. 2.
Figure 4:
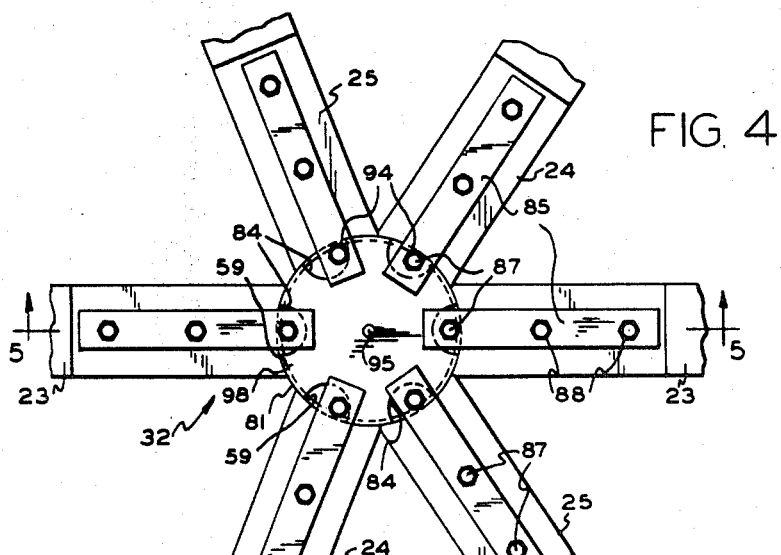
FIG. 4 is an enlarged, fragmentary, top plan view of a joint structure of the dome structure of FIG. 1.
Figure 5:
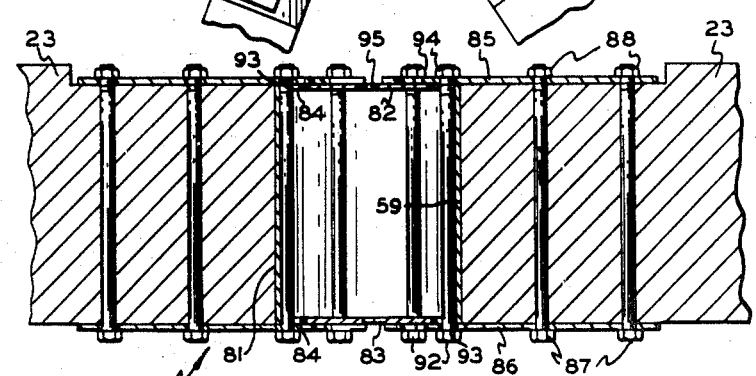
FIG. 5 is an enlarged fragmentary, vertical, sectional view taken along line 5—5 of FIG. 4.
Figure 6:
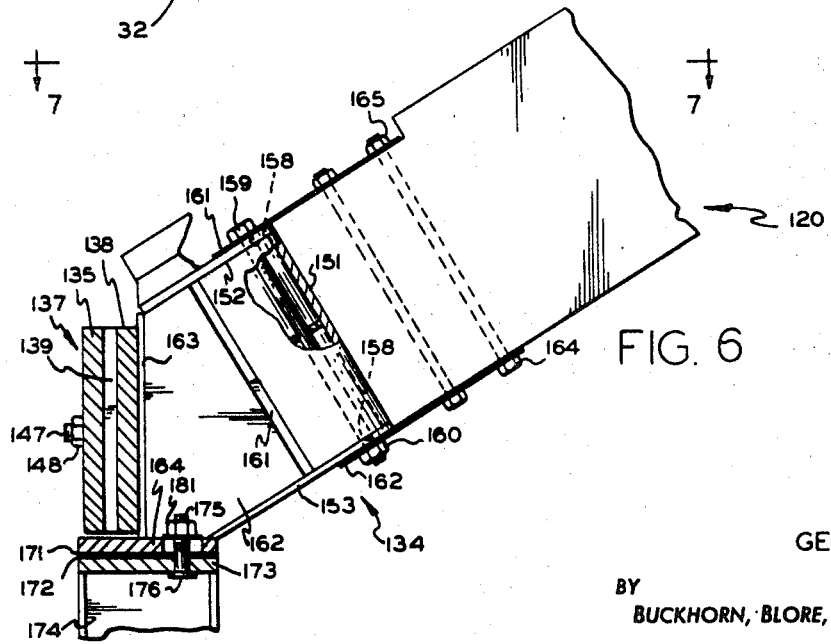
FIG. 6 is a fragmentary, vertical, sectional view of a dome structure forming an alternate embodiment of the invention.

Referring now in detail to the drawings, a dome structure 20 forming one embodiment of the invention and shown in FIGS. 1 to 5 includes a rigid, spherical, dome truss 22 of which a 60° segment is shown in FIG. 1, it being understood that there are six of such segments forming a spherical dome. The truss includes arcuate or straight beam members 23, 24 and 25 of laminated wood connected into triangles by joints 31, 32 and 34 and forming the rigid, dome truss with arcuate or straight perlins 35 and 36 and a tension ring 37, which is continuous for 360° and extends chordally between the joints 34. The joint 31 is the center joint and is substantially identical in structure to but larger than the joints 32, which connect most of the members 23, 24 and 25 together to form rigid triangles. The joint 31 also may be made as an open tube or open compression ring to permit passage of pipes, tubes, conveyors, or vents, and to form a means of access from the outer to the inner portion of the dome structure. Plank or panelized type decking 39 or other roof covering membrane is secured to the upper edges of the beams and the perlins.

The joints 34 are tension ring joints and connect the members 23, 24 and 25 to the tension ring 37. Each tension ring joint 34 includes a generally semi-cylindrical tube 51 (FIGS. 2 and 3) to which stiffener plates 52 and 53 having crescent-shaped holes 54 are welded. Bolts 55 pass through close-fitting holes in straps 56 and loosely through the holes 54 and lie against the inner periphery of the tube 51 to secure the straps to the tube and transmit tension from the straps 56 to the tube. Nuts 57 on the bolts 55 lock the bolts to the straps and to the tube. Each pair of the straps is bolted to the end portion of one of the beams 23, 24 or 25 and ends 59 of the beams are cylindrically concave and fit against and around the tube 51. The tube may have, in addition to the top and bottom stiffener plates, intermediate stiffener plates in the tube and having crescent-shaped clearance holes aligned with the holes 54 in the outer plates 52 and 53.

The tube 51 (FIGS. 2 and 3) is welded to a plate 61, which is welded to gussets 62 which are welded to a vertical wall 63 integral with the upper stiffener plate and to a base plate 64 to which the wall 63 is welded. Bolts 65 and nuts 66 secure the wall 63 rigidly to the tension ring 37. The base plate 64 is of steel and has bonded to the bottom face thereof a layer 71 of very low friction material, such as, for example, polytetrafluoroethylene. The layer 71 rests on a layer 72 also of the same very low friction material and bonded to the upper face of a steel supporting plate 73 anchored to a wall or column 74 of the building by vertical studs 75 passing through holes therein and through radial slots 76 in the base plate. Nuts 89 loosely screwed onto the upper ends of the studs hold the base plate on the supporting plate against vertical movement. The studs and the slots key or spline the base plate to the supporting plate to permit the base plate to move radially relative to the dome but prevent movement transverse to such radial movement. This permits the tension ring to be expanded and contracted without throwing radial horizontal load on the wall or column 74 of the building but permits horizontal forces on the dome structure to be resisted in the circumferential direction and transmitted to the supporting wall by the studs 75 bearing against the radial slots 76 in the base plate. The decking 39 (FIG. 1A) is secured to the beams to form the cover of the dome structure, and includes tongue and groove planks 77 and 78 laid on the beams and perlins starting with a key 79 which extends radially along a centerline 80 of one of the 60° sectors.

Each of the joints 31 and 32 (FIG. 1) connects the end portions of six of the beams 23, 24 and 25, and, since the joints 31 and 32 all are substantially identical in construction, only one of the joints 32 (FIGS. 1, 4 and 5) will be described in detail. The joint 32 includes a cylindrical tube 81 of steel having welded to the inner face or ends thereof top and bottom stiffener plates 82 and 83 having crescent-shaped clearance holes 84 positioned about the peripheries thereof. Straps 85 and 86 are bolted by bolts 87 and nuts 88 to the tops and bottoms of the end portions of the beams 23, 24 and 25, whose cylindrical end faces 59 abut the tube 81. Bolts 92 passing through holes 93 in the straps extend loosely through the crescent-shaped holes 84 in the stiffening plates and bear laterally against the inner periphery of the tube 81 to connect the beams to the tube for tension. Nuts 94 on the bolts 92 hold the straps on the bolts and retain the bolts in place. Central holes 95 in the stiffening plates are provided for attachment of a bracket, an eye-bolt, or the like to assist in moving segments of the dome structure during assembly thereof into the dome structure and/or to support equipment or components of construction inside the dome. The crescent-shaped clearance holes 84 provide large clearances to permit the connector consisting of the tube 81 and the stiffening plates 82 and 83 to be used for any of the joints 32, into which the beams 23, 24 and 25 may come over a wide range of angles. The stiffening plates 82 and 83 have tube-abutting portions or legs 98 positioned between the crescent-shaped clearance holes 84, and welded to the inner surface or ends of the tube. If desired, in addition to the plates 82 and 83, additional larger diameter plates can be provided either at one end or both ends of the tube with tabs extending radially outward from the tube for bearing against the top or bottom edge or edges of the beams 23, 24 and 25 to resist and transfer high shear forces between the tube 81 and beams 23, 24 and 25. These additional larger diameter plates may be attached to the tube by bolting or welding or a combination thereof. The tabs from these additional plates may bolt directly to the beams in a similar manner to and replacing straps 85 and 86.

EMBODIMENTS OF FIGS. 6 AND 7

A spherical dome structure 120 forming an alternate embodiment of the invention is generally similar to the dome structure 20 and includes a double tension ring assembly 137 including outer ring 135 and inner ring 138 secured to spacer plates 139 of wood or steel by bolts 147 and nuts 148 located on the tension ring between joints 134 which may be used to attach an eave purlin. Two other bolts 147 with nuts 148 located at each joint 134 are used to attach the tension ring joints 134 to the tension ring assembly 137 and pass through steel spacer plate 139. Each joint 134 is generally similar to the joints 34, and includes a semi-cylindrical tube 151 having welded thereto stiffening plates 152 and 153, a plate 161 and gussets 162. A vertical wall 163 integral with plate 152 is welded to base plate 164 having a layer 171 of very low friction material like the layer 71. The layer 171 rests on a similar layer 172 bonded to support plate 173 on wall column 174 of the building. Bolts 175 passing through radial slots 176 and hand tightened nuts 181 secure the dome and tensing ring assembly to the wall column 174 of the building for radial movement only.

The stiffening plates 152 and 153 have aligned cylindrical holes 158 spaced radially inwardly from the tube 151 and closely receiving bolts 159, which, with nuts 160, connect straps 161 and 162 to the plates to transmit tension in beams 123 and 124, to which the straps are secured, to the stiffening plates. Bolts 164 and nuts 165 connect the straps to the beams. The joints (not shown) corresponding to the joints 31 and 32 also may have cylindrical holes in the stiffening plates spaced radially inwardly from the inner peripheries of the tubes and receiving connecting bolts in close-fitting engagement to transmit tension from beams to the stiffening plates. This construction may be conveniently used where all the beams form angles of the same magnitude in a beam pattern in which all these angles are the same.

EMBODIMENT OF FIGS. 8, 9 AND 10

A dome structure 220 forming an alternate embodiment of the invention is substantially identical to the dome structure 20 except for a tension ring assembly 237 and tension ring joints 234 which connect beams 223 and 225 of laminated wood to a wall 274. The tension ring assembly 231 is of a built up or laminated, horizontal type including elongated, chordal, steel plates 238 arranged in spaced vertical stacks with end portions thereof overlapping and bolted by bolts 235 to steel splicing plates 239, the plate 239 being a top plate, the plates 240 being interleaving plates and the plate 241 being a bottom plate and having a pair of parallel guides 242 (FIG. 10) forming a guideway extending radially of the dome. The guides closely bracket a support plate 243 secured by anchor bolts 249 to a wall 274 and supported in a position slightly elevated from the top of the wall by grouting 265. Layers 263 of the above-described very low friction material cover and are bonded to the entire top surface of the plate 243 and the adjacent facing portion of the plate 241. Base plate 244 of the joint 234 is secured by studs 245, washers 273 and nuts 246 (FIG. 9) to the plates 237, 239, 240 and 241, the studs 245 extending through radial slots 247 in the plates 237, and 239 to 241 and 244 and being anchored in the wall and extending through close-fitting holes in the plate 243. As an alternate method to provide more flexibility and tolerance in the positiong of anchor studs 245, holes 287 in plate 243 may be oversize loose fitting for studs 245. Anchor bolts 249 with projecting threaded ends are fitted with mating, threaded leveling plates or nuts 275 (FIG. 10). These leveling plates may be adjusted to the desired elevation position by turning on their threads. Bearing plate 243 with anchor studs 245 welded thereto is positioned on leveling plates 275 and shifted to the desired horizontal plan location. When in the desired position, bearing plate 243 is welded to leveling plates 275 at the inner edges of oversize holes 287 in plate 243 at each leveling plate, at least three studs 249, three holes 287, and three leveling plates 275 being provided. Grout 265 is then forced under bearing plates 243 and 275 to transfer the vertical load on bearing plate 243 into the supporting wall. The plate 244 and a vertical plate 261 are welded to webs or gussets 262 to which are welded a plate 255. The edges of a semicylindrical tube 251 are welded to the plate 255. Stiffener plates 252 and 253 having crescent-shaped clearance holes or notches 254 are welded to the end portion of the tube and to the plate 255. Bolts 267 and nuts 268 connect straps 277 and 278 to the tube 251 for tension on the beams 223 and 225, to the tops and bottoms of which the straps are bolted. The ends of the beams are cylindrically grooved and fit closely on the tube 251. The bolts 267 bear radially against the inner periphery of the tube and, with the nuts 268, press the end portions of the straps against the ends of the tube 251. The bolts 267 extend loosely through the clearance holes 254.

EMBODIMENT OF FIGS. 11 AND 12

A dome structure 320 forming an alternate embodiment of the invention is like the dome structure 20 except for joints 332 corresponding to the joints 32 and connecting the end portions of beams 323, 324 and 325 together. The joint 332 includes a tube 381 of steel against which cylindrically concave ends 359 of the beams fit and abut. Interior stiffener plates 385 and 386 have aligned crescent-shape clearance openings or notches 384 for bolts 392 and are welded to the inside wall of the tube 381 with stiffener plates 382 and 383 welded to the ends of the tube.

The bolts 392 bear laterally against the inner periphery of the tube 381 to transmit forces of tension from the beam to the tube. The bolts 392 also pass through close-fitting holes in straps 377 and 378 secured by bolts 362 to the end portions of the beams 393, whose end portions have side tapered portions 369, as do the beams 324 and 325, to permit all the beams to fit against the tube, the tapered portions 369 of adjacent beams adjoining each other with clearance. The bolts 392 extend through oversize or arcuately slotted clearance holes 371 in shear discs 373 and 375 which abut either the top or bottom or both ends, respectively, of the tube end plates 382 and 383 and extend beyond the periphery of the tube into dapped portions 368 and 379 in the tops and bottoms of all the beams to connect the beams to the tube for shear. The shear discs are not integral with the tube. A single strap 361 may extend across the ends of the tube and connect to the beams 325 by bolts 367. The strap 361 connects the two beams 325 together and to the tube. Similarly, additional straps 353 may be welded to strap 361 and in the same plane as strap 361 forming a welded assembly to connect the two additional beams 324 together and to the tube. Similarly, additional straps may be added to the welded assembly to connect the beams 323 together and to the tube. Bolts 349 connect the straps 353 to the beams.

The above-described joints 31, 32 and 34 and the corresponding joints of the dome structures 120, 220 and 320 including the joints 134, 234 and 332 simply and strongly connect the beams together and to the tension ring structures for compression, shear and tension. The joints 31, 32 and 34, 234 and 332 have the crescent-shaped clearance holes and so are able to connect beams over a wide range of varying angles between the beams while high stiffening capacity of the stiffening plates is retained. The tension ring joints 34, 134 and 234 connect the beams rigidly to the tension ring 37 and the very high strength tension ring assemblies 137 and 237 and connect these structures to the wall or column structures for free radial movement to accommodate expansion and contraction of the tension ring structures while holding the tension ring structures and domes against both vertical and horizontal movement transversely to the radii of the dome.

What is claimed is:

1. The method of assembling a tension ring joint structure comprising screwing to the same level a plurality of tapped leveling plates on a plurality of threaded studs projecting upwardly from a wall, placing an anchor plate having clearance holes for the studs on the leveling plates in a horizontally adjusted position, welding the anchor plate to the leveling plates to prevent turning movement of the leveling plates and to anchor the anchor plate to the wall, and mounting a tension joint member on the anchor plate.

2. The method of claim 1 including filling the space between the wall and the plates with grout.

References Cited

UNITED STATES PATENTS

| | | | |
|---|---|---|---|
| 3,036,375 | 5/1962 | Schlosser et al. | |
| 3,049,201 | 8/1962 | King et al. | 52—293X |
| 3,099,900 | 8/1963 | Beck | 52—744 |
| 3,130,488 | 4/1964 | Lindstrom | 52—82X |
| 3,194,360 | 7/1965 | Richter | 52—81 |
| 3,194,853 | 7/1965 | Weise et al. | 52—744X |
| 3,268,996 | 8/1966 | Luketa | 29—407 |

CHARLIE T. MOON, Primary Examiner

U.S. Cl. X.R.

29—428, 460